United States Patent
daSilva et al.

(10) Patent No.: US 10,625,868 B2
(45) Date of Patent: Apr. 21, 2020

(54) BLEED AIR HEAT EJECTORS

(71) Applicant: Sikorsky Aircraft Corporation, Stratford, CT (US)

(72) Inventors: Jose A. daSilva, Cheshire, CT (US); Joseph Lawrence Simonetti, Southbury, CT (US); Donald William Lamb, Jr., North Haven, CT (US); Nhan R. Tran, West Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 353 days.

(21) Appl. No.: 15/645,354

(22) Filed: Jul. 10, 2017

(65) Prior Publication Data

US 2018/0016017 A1 Jan. 18, 2018

Related U.S. Application Data

(60) Provisional application No. 62/361,173, filed on Jul. 12, 2016.

(51) Int. Cl.
| | |
|---|---|
| *B64D 13/06* | (2006.01) |
| *F02C 7/00* | (2006.01) |
| *F02C 9/18* | (2006.01) |
| *F04F 5/20* | (2006.01) |
| *F02C 6/08* | (2006.01) |

(52) U.S. Cl.
CPC ............. *B64D 13/06* (2013.01); *F02C 6/08* (2013.01); *F02C 7/00* (2013.01); *F02C 9/18* (2013.01); *F04F 5/20* (2013.01); *B64D 2013/0618* (2013.01); *F05D 2220/323* (2013.01); *F05D 2240/127* (2013.01); *F05D 2260/601* (2013.01)

(58) Field of Classification Search
CPC ............ B64D 13/06; B64D 2013/0618; B64D 2013/0622; F02C 6/08; F02C 7/00; F02C 9/18; F04F 5/20
See application file for complete search history.

(56) References Cited

U.S. PATENT DOCUMENTS

| | | | |
|---|---|---|---|
| 3,825,212 A | 7/1974 | Darges et al. | |
| 6,139,423 A | 10/2000 | Wadey | |
| 6,412,270 B1 * | 7/2002 | Mortzheim | F01D 11/04 415/144 |
| 8,267,122 B2 * | 9/2012 | Weber | F01D 17/145 137/606 |
| 9,644,538 B2 * | 5/2017 | Dionne | B64D 33/08 |

(Continued)

*Primary Examiner* — Craig Kim
(74) *Attorney, Agent, or Firm* — Cantor Colburn LLP

(57) ABSTRACT

A bleed air heat ejector includes a housing defining an inner passage extending in an axial direction from an inlet of the housing to an outlet of the housing, wherein the inlet is configured to channel ambient air into the housing, and wherein the outlet is configured to channel mixed heated and ambient air out of the housing. A dispenser is mounted in the housing between the inlet and the outlet. The dispenser includes an inner chamber configured to receive heated air from a bleed line. The dispenser includes a plurality of apertures therein for issuing heated air from the inner chamber into the inner passage of the housing to form a flow of mixed ambient and bleed air. The apertures of the inner chamber can be angled primary jets, vortex generators can be included, and/or secondary jets can be included to promote mixing of bleed and ambient air.

14 Claims, 3 Drawing Sheets

(56) References Cited

U.S. PATENT DOCUMENTS

| | | | |
|---|---|---|---|
| 2003/0046938 A1* | 3/2003 | Mortzheim | F01D 17/105 60/782 |
| 2003/0205049 A1* | 11/2003 | Anderson | F02C 3/32 60/782 |
| 2010/0276517 A1* | 11/2010 | Alansary | B05B 7/0416 239/399 |
| 2015/0021006 A1 | 1/2015 | Vue et al. | |

* cited by examiner

BLEED AIR HEAT EJECTORS

CROSS-REFERENCE TO RELATED APPLICATIONS

This application claims benefit of priority to U.S. Provisional Patent Application No. 62/361,173 filed Jul. 12, 2016, which is incorporated by reference herein in its entirety.

STATEMENT REGARDING FEDERALLY SPONSORED RESEARCH OR DEVELOPMENT

This invention was made with government support under contract number FA8629-14-C-2403 awarded by the United States Air Force. The government has certain rights in the invention.

BACKGROUND OF THE INVENTION

1. Field of the Invention

The present disclosure relates to environmental control systems, and more particularly to bleed air heat ejectors such as used in environmental control systems onboard aircraft.

2. Description of Related Art

Heating a cabin onboard an aircraft can include using hot bleed air from a gas turbine engine, e.g. to heat the cabin during cold ambient conditions. Bleed air can be excessively hot for this purpose unless it is mixed with cooler air, such as ambient air. Traditional bleed air ejectors mix ambient air with the bleed air with the aim of providing a flow of uniformly heated air into the aircraft interior. Even with the use of traditional bleed air ejectors, care must be taken to ensure the air exiting the heating system is not excessively hot.

Such conventional methods and systems have generally been considered satisfactory for their intended purpose. However, there is still a need in the art for improved bleed air heat ejectors. The present disclosure provides a solution for this need.

SUMMARY OF THE INVENTION

A bleed air heat ejector includes a housing defining an inner passage extending in an axial direction from an inlet of the housing to an outlet of the housing, wherein the inlet is configured to channel ambient air into the housing, and wherein the outlet is configured to channel mixed heated and ambient air out of the housing. A dispenser is mounted in the housing between the inlet and the outlet. The dispenser includes an inner chamber configured to receive heated air from a bleed line. The dispenser includes a plurality of apertures therein for issuing heated air from the inner chamber into the inner passage of the housing to form a flow of mixed ambient and bleed air.

A plurality of vortex generators can be mounted in the inner passage downstream of the apertures in the inner chamber, wherein the vortex generators are configured to promote mixing of bleed and ambient air. The inner passage can define a venturi with a throat, wherein the apertures of the inner chamber are directed downstream from the throat of the venturi, wherein the vortex generators are circumferentially spaced apart around the venturi, and wherein the apertures of the inner chamber are directed at the vortex generators. The vortex generators can each be pyramidal, e.g., tetrahedronal. Each pyramidal vortex generator can have a leading edge directed tangentially to impart swirl on flow from the apertures of the inner chamber. The pyramidal vortex generators can each have a base width and are circumferentially spaced apart from one another by a distance of about 2-3 times the base width of the pyramidal vortex generators.

In another aspect, a plurality of secondary jets in fluid communication with the inner chamber for discharging bleed air into the inner passage downstream of the apertures of the inner chamber, e.g., the secondary jets can be included with or without vortex generators. The secondary jets are circumferentially spaced apart around the venturi described above, and wherein the apertures of the inner chamber are directed toward the secondary jets. The secondary jets can be angled to direct converging flows into the inner passage. It is also contemplated that the secondary jets can be angled to direct tangential flows into the inner passage for circumferential swirl about the inner passage. The secondary jets can be circumferentially spaced apart from one another by a circumferential angle of 30-60 degrees.

In another aspect, the apertures of the inner chamber can be primary jets, wherein the primary jets are angled obliquely relative to the axial direction, e.g., with or without vortex generators or secondary jets as those described above. The primary jets can be angled to direct converging flows into the inner passage. The primary jets of the inner chamber can be directed downstream from the throat of the venturi described above, and can be circumferentially spaced around the venturi. The primary jets can be angled to direct tangential flows into the inner passage for circumferential swirl about the inner passage. The primary jets can each have a diameter and can be circumferentially spaced apart from one another by a distance of about 2-3 times the diameter of the primary jets, or by an angle of 10-20 degrees. The primary jets can be defined as apertures through a frustoconical wall separating the inner chamber from the inner passage, wherein the frustoconical wall diverges in a downstream axial direction.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
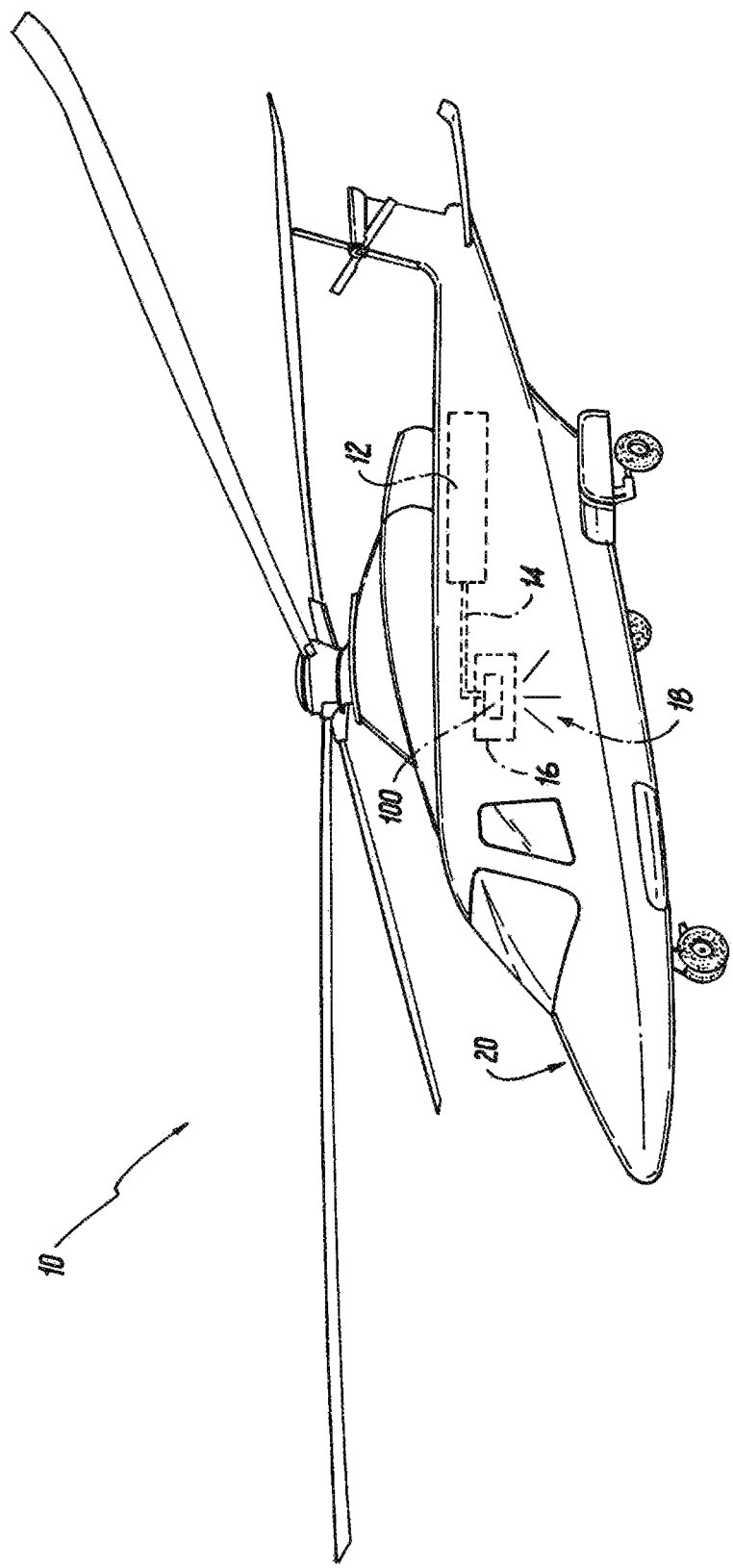
FIG. 1 is a schematic side elevation view of an exemplary embodiment of an aircraft, showing a bleed air heat ejector constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of a bleed air heat ejector in accordance with the disclosure is shown in FIG. 1 and is designated generally by reference character 100. Other embodiments of heat ejectors in accordance with the disclosure, or aspects thereof, are provided in FIGS. 2-5, as will be described. The systems and methods described herein can be used to promote mixing of ambient and bleed air to provide a more uniform temperature in flow from environmental control systems relative to traditional systems.

Aircraft 10 is depicted as a rotorcraft, however those skilled in the art will readily appreciate that systems and methods in accordance with this disclosure can be used with any suitable type of aircraft or in any other application without departing from the scope of this disclosure. Aircraft 10 includes an engine 12, e.g., a gas turbine engine such as a main engine or auxiliary power unit (APU). A bleed air line 14 connects between engine 12 and environmental control system 16, which issues conditioned air 18, e.g., heated air, into cabin 20 of aircraft 10. Environmental control system 16 includes bleed air heat ejector 100, connected to bleed line 14 for fluid communication of bleed air from engine 12 to heat ejector 100.

Figure 2:
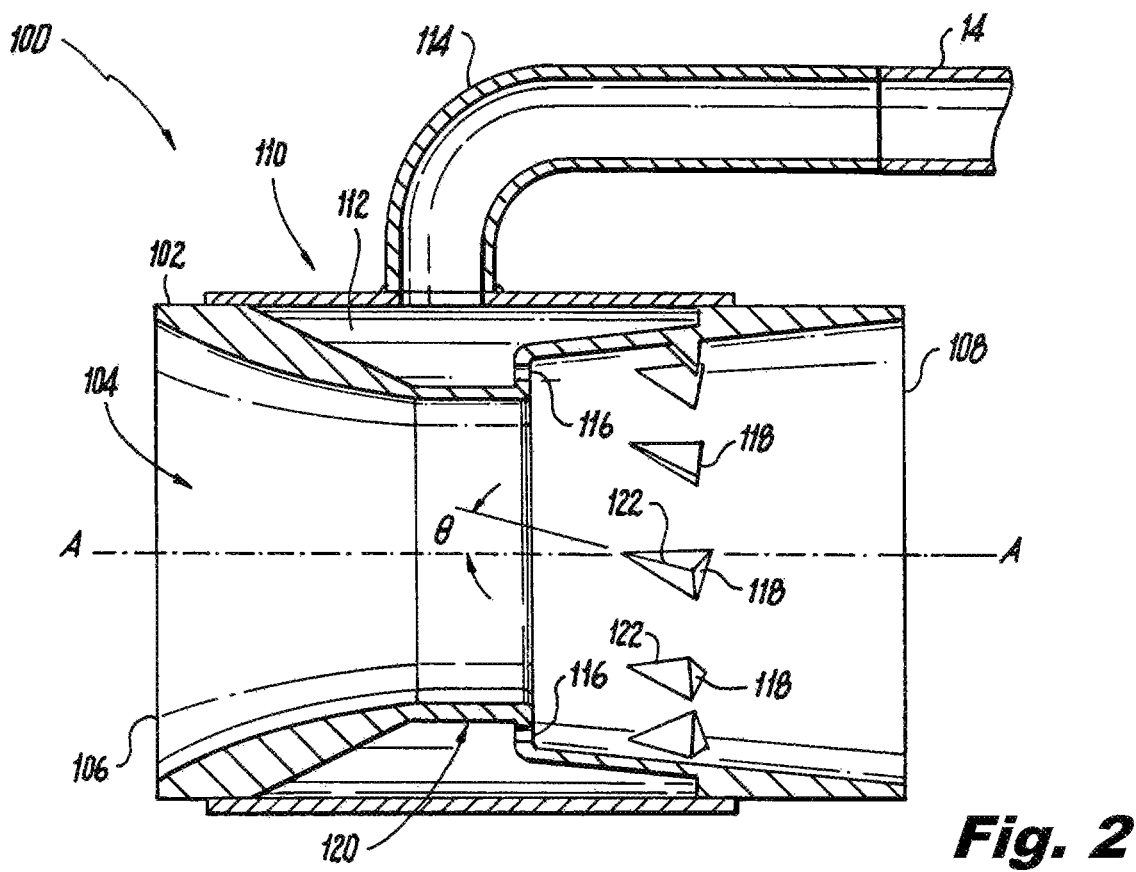
FIG. 2 is a cross-sectional side-elevation view of the heat ejector of FIG. 1, showing the axial position and tangential orientation of the vortex generators.

With reference now to FIG. 2, bleed air heat ejector 100 includes a housing 102 defining an inner passage 104 extending in an axial direction, e.g. along axis A, from an inlet 106 of the housing 102 to an outlet 108 of the housing 102. The inlet 106 is configured to channel ambient air into the housing 102, and the outlet 108 is configured to channel mixed heated and ambient air out of the housing 102. A dispenser 110 is mounted in the housing between the inlet 106 and the outlet 108. The dispenser 110 includes an inner chamber 112 configured to receive heated air from bleed line 14 through bleed inlet 114. The dispenser 110 includes a plurality of apertures 116 therein for issuing heated air from the inner chamber 112 into the inner passage 104 of the housing 102 to form a flow of mixed ambient and bleed air issuing from the outlet 108.

Figure 3:
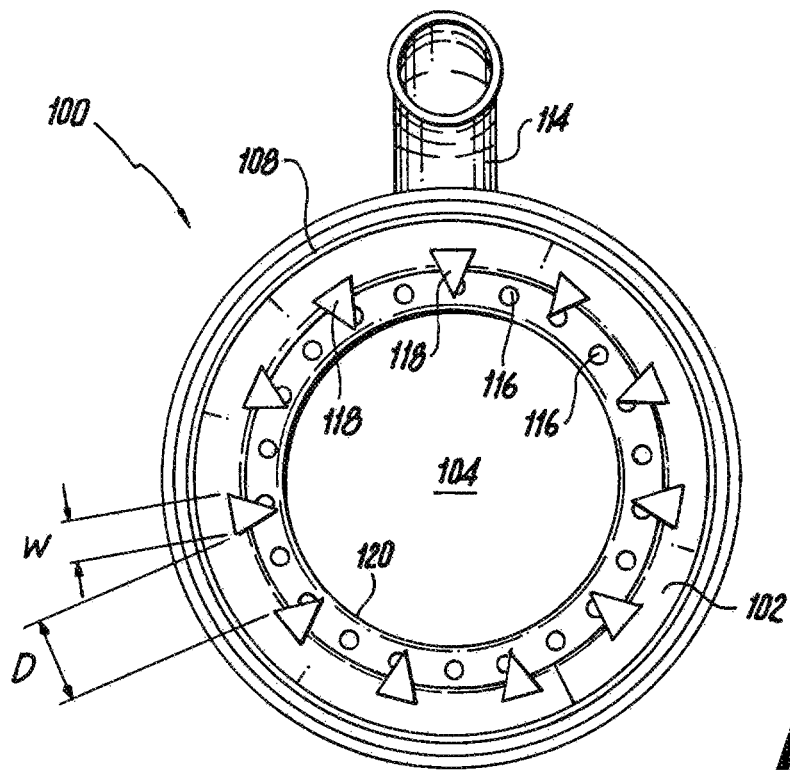
FIG. 3 is an axial end view of the bleed air heat ejector of FIG. 1, showing the vortex generators.

A plurality of vortex generators 118 are mounted in the inner passage 104 downstream of the apertures 116 in the inner chamber 112. The vortex generators 118 are configured to promote mixing of bleed and ambient air. The inner passage 104 can define a venturi with a throat 120, wherein the apertures 116 are directed downstream from the throat 120 of the venturi. As shown in FIG. 3, the vortex generators 118 are circumferentially spaced apart, e.g., around the venturi. The apertures 116 on the whole are directed at the vortex generators 118. The vortex generators 118 are pyramidal, e.g., tetrahedronal. Each pyramidal vortex generator 118 has a leading edge 122, as shown in FIG. 2. The leading edges 122 are directed tangentially, e.g. angled at angle θ relative to axis A, to impart swirl on flow from the apertures 116. Referring again to FIG. 3, the pyramidal vortex generators 118 each have a base width W and are circumferentially spaced apart from one another by a distance D of about 2-3 times the base width W of the pyramidal vortex generators 118. Vortices formed and shed from vortex generators 118 promote mixing and uniform temperatures in flow discharged from the outlet 108.

Figure 4:
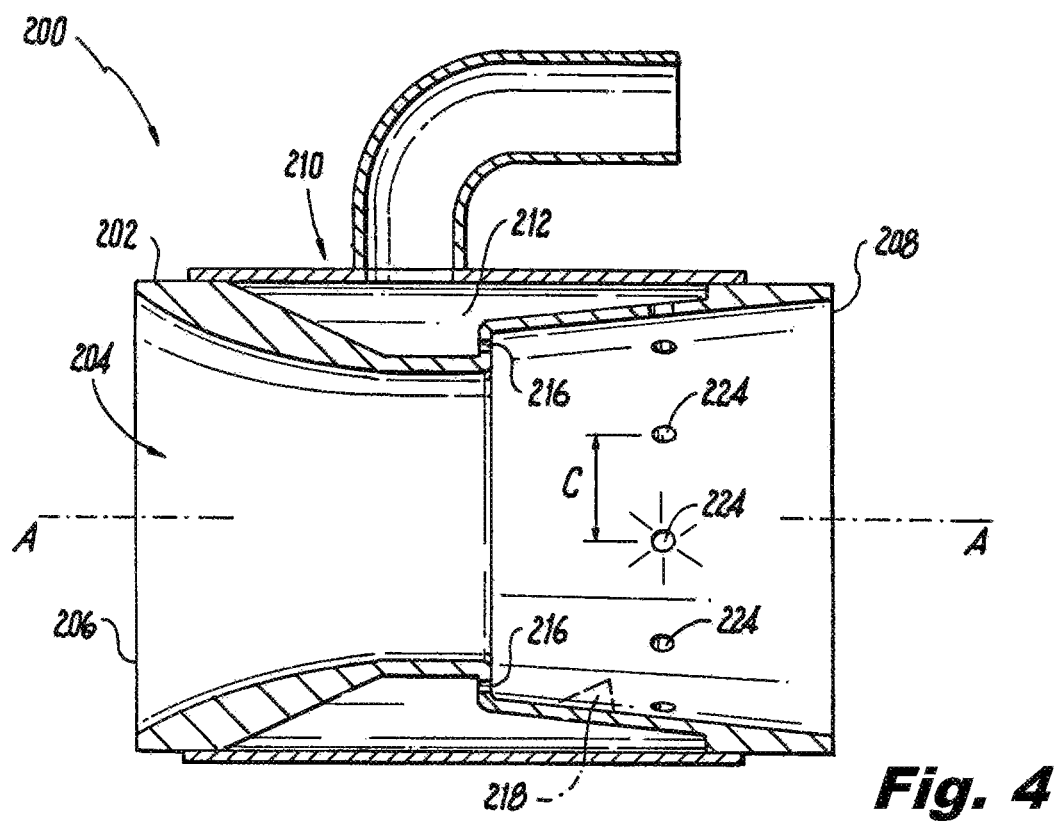
FIG. 4 is a cross-sectional side-elevation view of another exemplary embodiment of a heat ejector constructed in accordance with the present disclosure, showing secondary jets for promotion of mixing of ambient and bleed air.

Referring now to FIG. 4, another exemplary embodiment of a heat ejector 200 is shown, having a housing 202, inner passage 204, inlet 206, outlet 208, and dispenser 210 similar to those described above with reference to FIGS. 2-3. A plurality of secondary jets 224 are in fluid communication with the inner chamber 212 for discharging bleed air into the inner passage 204 downstream of the apertures 216 of the inner chamber 212. Optionally, the secondary jets 224 can be included with vortex generators as indicated by the dashed lines showing the position of a potential vortex generator 218. The secondary jets 224 are circumferentially spaced apart around the venturi of housing 202, and the apertures 216 of the inner chamber 212 as a whole are directed toward the secondary jets. The secondary jets 224 are angled slightly inward toward axis A to direct converging flows into the inner passage 204. It is also contemplated that the secondary jets 224 can be angled to direct tangential flows into the inner passage 204 for circumferential swirl about the inner passage 204, or can be angled on any other suitable angle as indicated by the radiating lines in FIG. 4. The secondary jets 224 can be circumferentially spaced apart from one another by a circumferential angle, represented in FIG. 4 by C, of 30-60 degrees.

Figure 5:
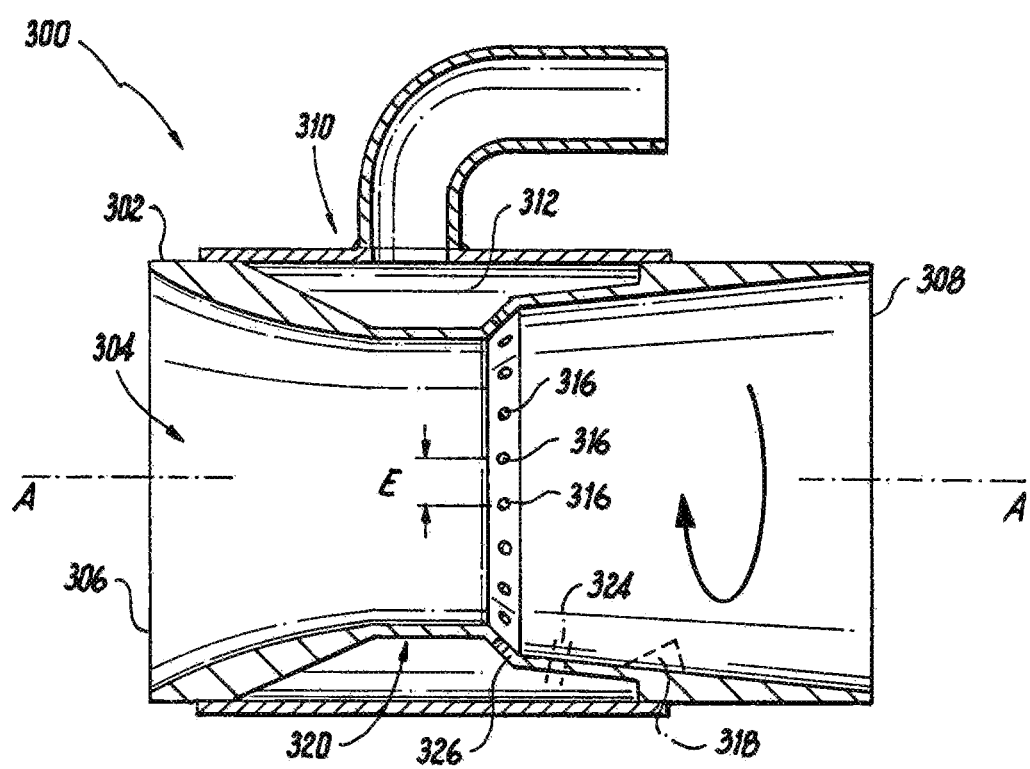
FIG. 5 is a cross-sectional side-elevation view of another exemplary embodiment of a heat ejector constructed in accordance with the present disclosure, showing angled primary jets for promotion of mixing of ambient and bleed air.

With reference now to FIG. 5, another exemplary embodiment of a heat ejector 300 is shown, having a housing 302, inner passage 304, inlet 306, outlet 308, and dispenser 310 similar to those described above with reference to FIGS. 2-3. The apertures of the inner chamber 312 are primary jets 316, wherein the primary jets 316 are angled obliquely relative to the axial direction of axis A. The primary jets 316 are angled to direct converging flows into the inner passage 304. The primary jets 316 are directed downstream from the throat 320 of the venturi of housing 302, and are circumferentially spaced apart around the venturi. The primary jets 316 can be optionally angled to direct tangential flows into the inner passage for circumferential swirl about the inner passage as indicated by the swirl arrow in FIG. 5. The primary jets 316 circumferentially spaced apart from one another by a distance E of about 2-3 times the diameter of the primary jets, or by an angle of 10-20 degrees. The primary jets 316 are defined as apertures through a frustoconical wall 326 separating the inner chamber 312 from the inner passage 304, wherein the frustoconical wall 326 diverges in a downstream axial direction along axis A. Optionally, vortex generators 318 or secondary jets 324 as those described above can be included in housing 302 as indicated by the broken lines in FIG. 5.

The methods and systems of the present disclosure, as described above and shown in the drawings, provide for bleed air ejection with superior properties including improved mixing, higher heat output with a lower mixed exit temperature, and more uniform temperature in issued air flow relative to traditional systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A bleed air heat ejector comprising:
a housing defining an inner passage extending in an axial direction from an inlet of the housing to an outlet of the housing, wherein the inlet is configured to channel ambient air into the housing, and wherein the outlet is configured to channel mixed heated and ambient air out of the housing;

a dispenser mounted in the housing between the inlet and the outlet, wherein the dispenser includes an inner chamber configured to receive heated air from a bleed line, wherein the dispenser includes a plurality of apertures therein for issuing heated air from the inner chamber into the inner passage of the housing to form a flow of mixed ambient and bleed air; and a plurality of vortex generators mounted in the inner passage downstream of the apertures in the inner chamber, wherein the vortex generators are configured to promote mixing of bleed and ambient air.

2. A bleed air heat ejector as recited in claim 1, wherein the inner passage defines a venturi with a throat, wherein the apertures of the inner chamber are directed downstream from the throat of the venturi, wherein the vortex generators are circumferentially spaced apart around the venturi, and wherein the apertures of the inner chamber are directed at the vortex generators.

3. A bleed air heat ejector as recited in claim 1, wherein the vortex generators are each pyramidal.

4. A bleed air heat ejector as recited in claim 3, wherein each pyramidal vortex generator has a leading edge directed tangentially to impart swirl on flow from the apertures of the inner chamber.

5. A bleed air ejector as recited in claim 3, wherein the pyramidal vortex generators each have a base width and are circumferentially spaced apart from one another by a distance of about 2-3 times the base width of the pyramidal vortex generators.

6. A bleed air ejector as recited in claim 3, wherein the pyramidal vortex generators are tetrahedronal.

7. A bleed air ejector as recited in claim 1, further comprising:
a plurality of secondary jets in fluid communication with the inner chamber for discharging bleed air into the inner passage downstream of the vortex generators.

8. A bleed air heat ejector comprising:
a housing defining an inner passage extending in an axial direction from an inlet of the housing to an outlet of the housing, wherein the inlet is configured to channel ambient air into the housing, and wherein the outlet is configured to channel mixed heated and ambient air out of the housing;

a dispenser mounted in the housing between the inlet and the outlet, wherein the dispenser includes an inner chamber configured to receive heated air from a bleed line, wherein the dispenser includes a plurality of primary jets therein for issuing heated air from the inner chamber into the inner passage of the housing to form a flow of mixed ambient and bleed air, wherein the primary jets are angled obliquely relative to the axial direction; and plurality of vortex generators mounted in the inner passage downstream of the primary jets, wherein the vortex generators are configured to promote mixing of bleed and ambient air.

9. A bleed air heat ejector as recited in claim 8, wherein the primary jets are angled to direct converging flows into the inner passage.

10. A bleed air heat ejector as recited in claim 8, wherein the inner passage defines a venturi with a throat, wherein the primary jets of the inner chamber are directed downstream from the throat of the venturi and are circumferentially spaced apart around the venturi.

11. A bleed air heat ejector as recited in claim 8, wherein the primary jets are angled to direct tangential flows into the inner passage for circumferential swirl about the inner passage.

12. A bleed air ejector as recited in claim 8, wherein the primary jets are circumferentially spaced apart by an angle of 10-20 degrees.

13. A bleed air ejector as recited in claim 8, wherein the primary jets are defined as apertures through a frustoconical wall separating the inner chamber from the inner passage, wherein the frustoconical wall diverges in a downstream axial direction.

14. A bleed air ejector as recited in claim 8, further comprising:
a plurality of secondary jets in fluid communication with the inner chamber for discharging bleed air into the inner passage downstream of the primary jets.

* * * * *